Patented Jan. 16, 1945

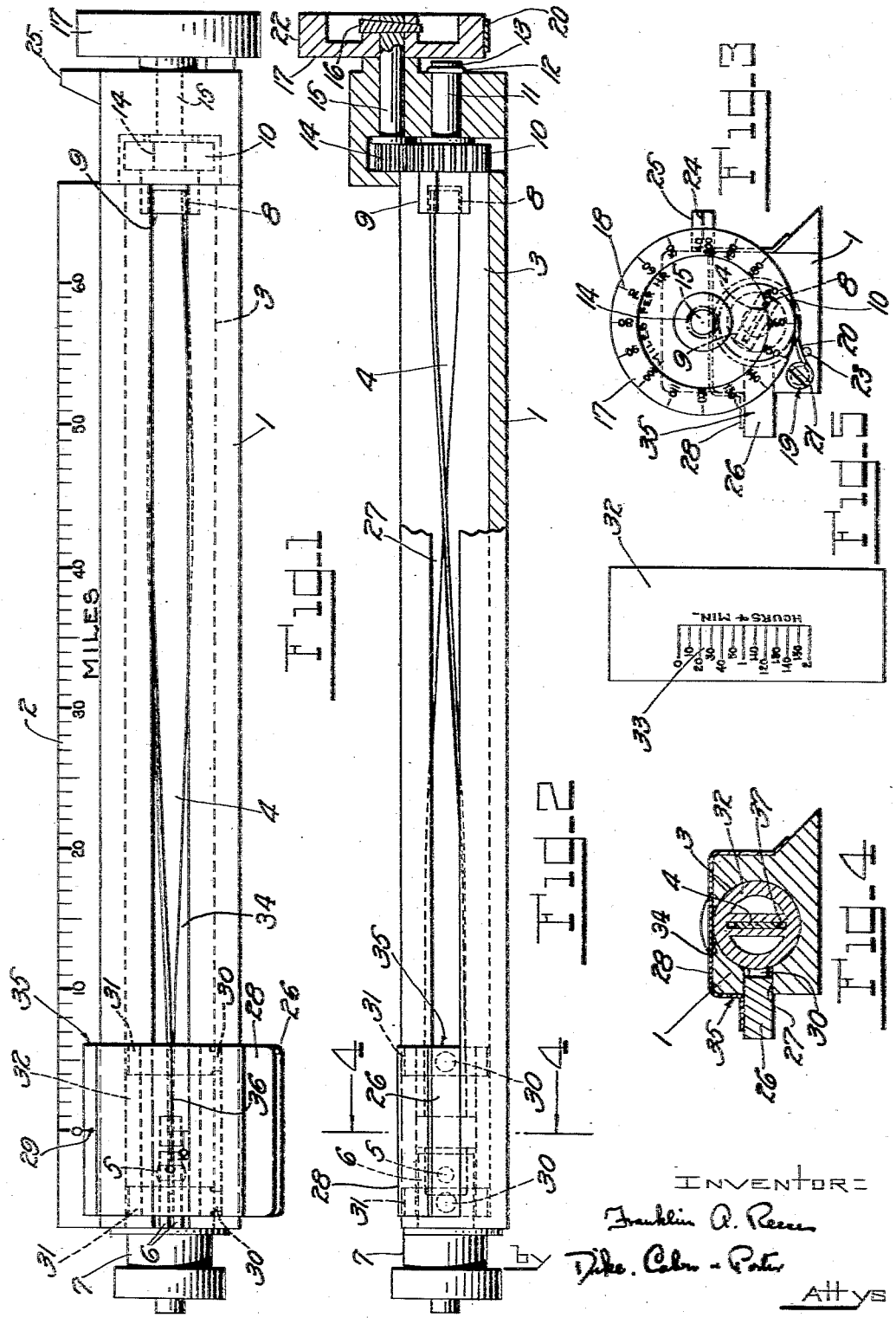

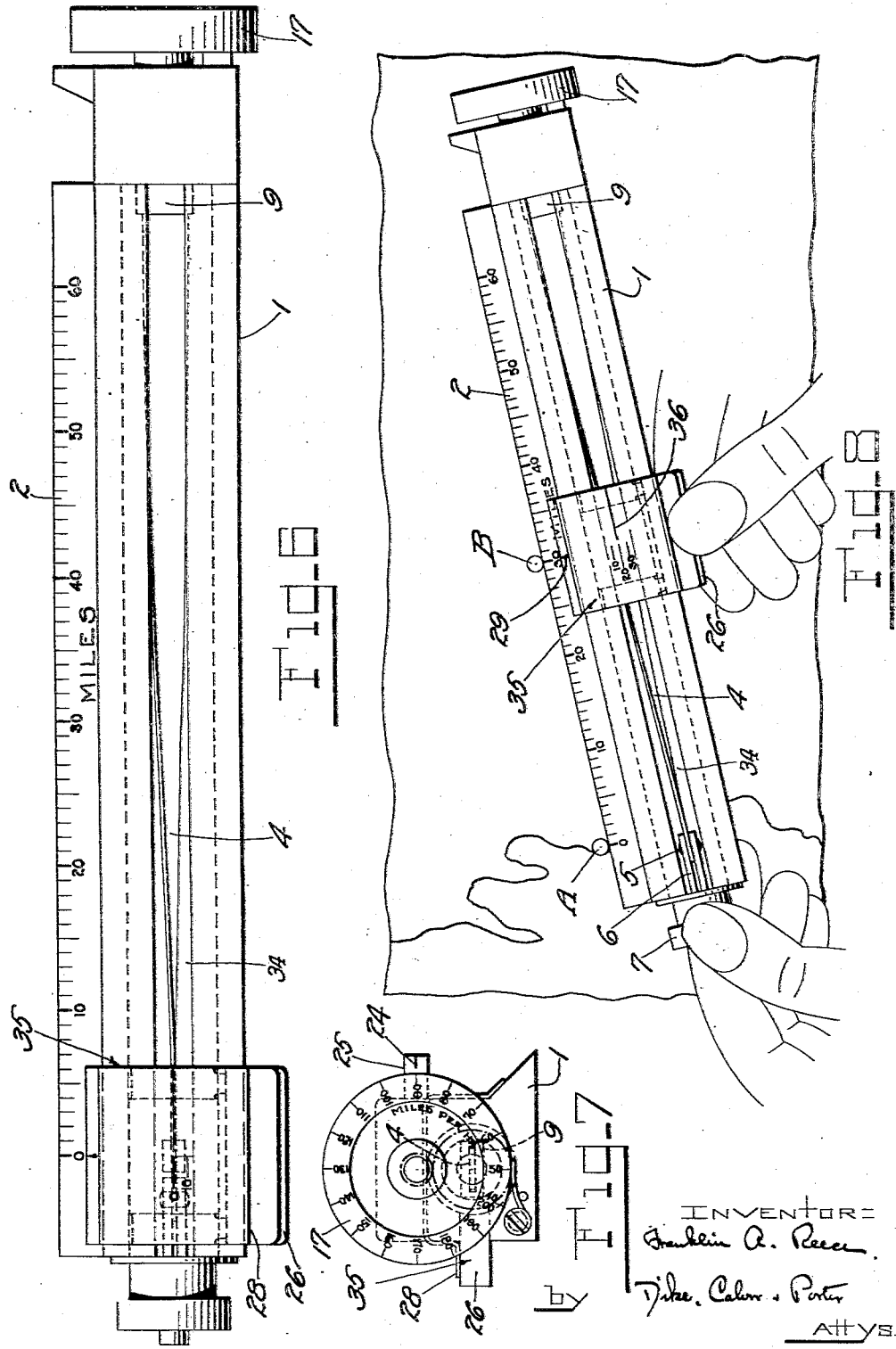

2,367,431

UNITED STATES PATENT OFFICE 2,367,431

NAVIGATION INSTRUMENT

Franklin A. Reece, Brookline, Mass.

Application July 29, 1941, Serial No. 404,480

8 Claims. (Cl. 235—61)

This invention relates to a combined map gauge and computing instrument adapted especially, although not exclusively, to aerial navigation, and capable, in conjunction with a suitable map, or, in some instances independently thereof, to indicate directly the time required to cover given distances, or, conversely, the distances covered in given times, at a given ground speed, as well as affording convenient means for directly determining actual ground speed. By setting the instrument for the estimated or assumed ground speed, a time register or indicator movable over a distance scale to different positions thereon is caused to indicate the time required (at that ground speed) to cover any distance determined by its position on the scale, or, conversely, its position on the scale will indicate the distance covered in a given elapsed time registered by the indicator, so that, by applying the distance scale to a map, the prospective time of arrival at a given objective will be shown, and the pilot's position at any given time (as shown by a suitable timepiece) can be determined whether the ground is visible or not. The correctness of the original assumption as to ground speed (and the consequent initial setting of the instrument for this factor) can be checked, and verified or corrected, at an early period in the flight (and from time to time thereafter) by observing the time of arrival over a recognizable landmark whose distance from a starting point is known or can be scaled on the map, comparing this with the time registered by the time indicator when positioned on the distance scale to correspond to this distance, and the ground speed setting changed, if necessary, to make the time indicator register the actual observed time, whereupon the ground speed will be directly shown by such setting.

The ability to determine actual ground speed quickly and accurately is itself a great advantage, and so is the ability to make frequently repeated checks without using a great deal of the navigator's time for computations. There is also the further advantage that the instrument aids the navigator in "dead reckoning" (in which a course is estimated from the air speed and the direction and velocity of the wind) by supplying a check on the speed along the projected path taken.

The invention will be best understood from the following description in conjunction with the accompanying drawings. It is to be understood that the invention is not limited to the details of construction and arrangement of parts illustrated in the drawings, since the invention, as defined by the claims hereinafter appended, may be otherwise embodied without departure from the spirit and scope thereof.

It is also to be understood that the terms here used are for the purpose of description and not of limitation, and it is not intended to limit the invention claimed herein beyond the requirements of the prior art.

In said drawings:

Fig. 1 is a plan view of a device embodying the invention;

Fig. 2 is a side elevation thereof, partly in section;

Fig. 3 is an end view as seen from the right of Fig. 2;

Fig. 4 is a section taken on the line 4—4 of Fig. 2;

Fig. 5 is a development of the time indicator drum;

Fig. 6 is a view similar to that of Fig. 1 but showing the instrument set up for a different ground speed;

Fig. 7 is an end view as seen from the right of Fig. 6; and

Fig. 8 is a diagrammatic view illustrating the use of the instrument in connection with a map.

The instrument shown in the drawings comprises a rule body 1 provided along one edge with a distance scale 2 graduated in units of distance, e. g. miles. The scale of the graduations corresponds to that of the map in connection with which the instrument is to be used. A circular channel 3 is formed longitudinally in said rule body 1, and extending longitudinally through said channel is a (preferably metallic) flexible guide or controller strip 4 anchored at one end (preferably as hereinafter described) to the rule body at that end of the channel 3 nearest the zero point on the scale 2. The other end of said strip is received in a slot 8 in a projection 9 extending coaxially from the inner face of a gear 10 mounted on a shaft 11 journalled in the end of the rule body 1 opposite the zero point on the scale 2. Displacement of the shaft 11 is prevented by a ring 12 in the annular channel 13 of the shaft 11. Held in mesh with gear 10 is a pinion 14 mounted on a shaft 15 similarly journalled in the rule body 1. Secured to the other end of the shaft 15 by a pin 16 is a speed indicator dial 17 bearing a circumferential scale 18 indicating units of distance per unit of time, e. g., miles per hour. The dial 17 is retained in adjusted angular position by a small friction brake 19 comprising a spring 20 secured to the end wall of the rule body 1 by a fastener 21 and held tightly against the periphery 22 of the dial 17 by a post 23. An index mark 24 is formed on a projection 25 on the rule body 1 in such manner as to cooperate with the scale 18 to indicate the angular adjustment of the dial 17. Rotation, or angular adjustment, of the dial 17 causes the strip 4 to be twisted or helically deformed, the pitch of such helical deformation depending upon the angular adjustment of said dial.

A block 26 is slidably mounted in a guide slot 27 formed in the rule body 1 and extending from the side wall thereof to the channel 3. Secured to the upper exposed surface of said block is a transparent cap 28 which extends over and closely adjacent the upper surface of said rule body 1, as shown in Figs. 1 and 4, and which, in conjunction with the block 26, constitutes a rider 35 slidable, or movable longitudinally, over the rule body. An index mark 29 is placed on the edge of the cap 28 near the distance scale 2 for cooperation therewith to indicate the position of the rider 35 with respect to said scale. Secured to said block 26, as by connecting studs 30, 30 are tubular guide members 31, 31 which are slidable in the circular channel 3 and which prevent withdrawal of the slide block 26 from the guide slot 27. The flexible guide strip 4 passes through the tubular members 31 without contact. A drum 32 constituting a time indicator and bearing on its periphery a cylindrical scale 33 indicating units of time, e. g., hours and minutes, is rotatably held between the tubular guides 31, 31. The rule body has in its upper face a slot 34 through which the scale 33 is visible, and the transparent cap 28 of the rider 35 is provided with an index mark 36 cooperating with said scale 33. The flexible guide strip 4 passes through a slot 37 in the drum 32 so that, as the rider 35 is moved along the scale 2, the drum is rotated an amount determined jointly by the extent of such movement and the twist given the strip by the angular adjustment of the dial 17.

The use of the device above described in conjunction with a suitable map, whose scale corresponds to the scale 2, is illustrated in Fig. 8. Assume that the aviator is leaving a starting point A to fly in the direction of a station B. Before starting, his probable ground speed on this initial course is computed or estimated and the dial 17 is turned until this estimated ground speed in miles per hour is indicated by the proper numeral at a point opposite the index mark 24. This movement of the dial is transmitted in reduced degree to the strip 4 by the gears 10 and 14, so that the strip is given a slight, substantially uniform twist throughout its length. Then the distance scale 2 is placed over the map, as shown in Fig. 8, and the rider 35 moved along said scale until the index mark 29 is opposite the station B. As the rider 35 is moved, the twist in the guide strip 4, resulting from the setting of the dial 17, turns the drum 32 and the scale 33, so that the time graduation on said scale which is brought opposite the index mark 36 registers or indicates to the pilot the time at which he would expect to reach, or be over, station B when flying at the assumed ground speed. Similarly, by moving the rider to bring the index mark 29 opposite various intermediate points along the course, the expected time of arrival at these points will be registered by the indicator or scale 33, and, conversely, by so setting the rider as to cause the indicator to register a given actual elapsed time (as shown by the pilot's watch) the pilot's position at that time will be indicated on the map by the index mark 29 whether the ground is visible or not.

Assuming that the station B is a check station, or one whose identity can be readily recognized from the air, when this station is reached the actual elapsed time of flight (as shown by the pilot's watch) is compared with the time reading given by the indicator 33 when the index mark 29 is opposite this station. If the times differ, then the actual elapsed time can be used as the known factor and the ground speed the unknown. The rider 35 being left with its index mark 29 opposite the station B, the dial 17 is turned until the actual elapsed time is registered by the time indicator 33. The speed scale 18 on the dial 17 then indicates the correct ground speed. As other check stations are reached, the readjustment for ground speed can, in the same way, be rechecked and verified or corrected in accordance with conditions.

For convenience in accurately setting the guide strip 4 so that when the index mark 29 on the rider 35 is at the zero point on the scale 2 the time scale 35 on the drum 32 will also register zero, the end of said strip adjacent the zero end of the scale 2 may be secured, as by a pin 5, to a hub 6 rotatably mounted in said rule body coaxial with the channel 3, said hub having an operating handle 7.

I claim:

1. A pilotage instrument comprising, in combination, a rule body, an indicator comprising a scale graduated in units of time movable over said rule body, a twistable guide for said time scale, an adjusting member movably mounted in said rule body and having a scale marked to indicate speed in units of distance per units of time, and means associated with said adjusting member for twisting said guide.

2. A computing rule comprising, in combination, a rule body, a rotary time indicator movable thereover, a dial adjustable in said rule body and marked to indicate speed in units of distance per units of time, and a twistable guide associated with said dial for rotating said time indicator, as it is moved over said rule body, to a variable extent determined by the adjusted position of said dial.

3. A pilotage instrument comprising, in combination, a rule body, a rider slidably mounted on said body, a drum rotatably associated with said rider, a flexible guide strip for said drum, said drum having a peripheral scale indicating units of time, a member adjustable in said rule body and having a scale indicating speed in units of distance per units of time, and means connecting said adjusting member and said flexible strip adapted to twist said strip as said member is adjusted.

4. A pilotage instrument comprising, in combination, a rule body, a rider slidably mounted on said body, a drum rotatably associated with said rider and having a peripheral time scale, a flexible strip on which said drum is guided and adapted to fix the angular position thereof, a rotatable dial having a speed scale, and means connecting said dial and said flexible strip adapted to twist said strip as said dial is turned.

5. A pilotage instrument comprising, in combination, a distance scale, a time indicator movable over said scale, a twistable guide for varying the indication of said time indicator as it is moved over said scale, a member adjustable in accordance with speed, and means associated with said member for twisting said guide.

6. In a pilotage instrument, the combination of a rule body, a distance scale, a rotatable indicator having a scale marked in units of time, means for moving the indicator along the distance scale, a helically deformable guide for the indicator adapted to cause it to register values as it is moved over the scale which vary in accordance with the distance moved and the pitch of the helical deformation of the guide, a scale marked to indicate speed in units of distance per units of time, selective means for choosing a particular speed on the speed scale, and means correlated therewith for adjusting the helical deformation of the guide.

7. An instrument for coordinating the three independently variable but mutually dependent factors of time, speed and distance including, in combination, a rule body, a linear distance scale, a drum bearing a scale graduated in units of a second factor, a slot formed in the drum, a flexible guide for the drum adapted to pass through the slot, a scale graduated in units of a third factor, a control member for the guide adapted to be adjusted in accordance with the third factor, connecting means for transmitting the adjustment of the control member to the flexible guide, and means for moving the drum simultaneously along the distance scale and the flexible guide to cause it to indicate values which vary according to the distance moved and the adjustment of the guide.

8. In a pilotage instrument, the combination of a rule body, a guide slot extending longitudinally of the rule body, a distance scale extending longitudinally of the rule body, a rider adapted to follow the guide slot, index means carried by the rider adapted to cooperate with the distance scale, a rotatable indicator carried by the rider, a helically deformable guide strip for the rotatable indicator, and a member for adjusting the pitch of the helical deformation of the guide movably mounted in the rule body having a scale marked to indicate speed in units of distance per units of time.

FRANKLIN A. REECE.